United States Patent [19]

Weisweiler et al.

[11] Patent Number: 5,219,543

[45] Date of Patent: Jun. 15, 1993

[54] PROCESS AND APPARATUS FOR REMOVING DUST, SULFUR COMPOUNDS AND NITROGEN OXIDES FROM COMBUSTION EXHAUST GASES

[75] Inventors: Werner Weisweiler, Remchingen-Singen; Erhard Herrmann, Karlsbad-Spielberg; Wolfgang Fennemann, Karben; Harald Sauer, Frankfurt am Main; Bernd Thöne, Friedberg, all of Fed. Rep. of Germany

[73] Assignee: Metallgesellschaft Aktiengesellschaft, Frankfurt am Main, Fed. Rep. of Germany

[21] Appl. No.: 803,185

[22] Filed: Dec. 5, 1991

[30] Foreign Application Priority Data

Dec. 8, 1990 [DE] Fed. Rep. of Germany ....... 4039213

[51] Int. Cl.⁵ .................. B01J 8/00; C01B 21/00; C01B 17/00
[52] U.S. Cl. ................... 423/239; 423/244.01
[58] Field of Search ........... 423/243, 244 A, 244 R, 423/235, 239

[56] References Cited

U.S. PATENT DOCUMENTS 3,781,408 12/1973 Lin ............................ 423/244
4,670,237 6/1987 Graf et al. ..................... 423/244
4,782,771 11/1988 Bergkvist ....................... 423/235
5,096,680 5/1992 Lindbauer et al. ............. 423/244

FOREIGN PATENT DOCUMENTS 3701527 4/1988 Fed. Rep. of Germany.
3642980 6/1988 Fed. Rep. of Germany.

Primary Examiner—Gregory A. Heller
Attorney, Agent, or Firm—Michael J. Striker

[57] ABSTRACT

The process of removing dust, sulfur compounds and nitrogen oxides from combustion exhaust gases, comprising mixing a combustion exhaust gas with ammonia; feeding $Ca(OH)_2$ and $FeSO_4$ to a fluidized bed reactor containing mixed solids including fly ash, iron sulfates and calcium compounds, especially $Ca(OH)_2$, $CaCO_3$, $CaO$, $CaSO_4$ and $CaSO_3$; supplying an ammonia-containing exhaust gas mixture to the fluidized bed reactor as a fluidizing gas; operating the fluidized bed reactor at a temperature between 300° and 450° C. to form a reacted exhaust gas; supplying the reacted exhaust gas to a multistage electrostatic precipitator having a first stage and additional stages; recycling solids collected in the first stage to the fluidized bed reactor; and recycling one portion of additional solids collected in the additional stages to the fluidized bed reactor and discharging another portion of the additional solids.

9 Claims, 1 Drawing Sheet

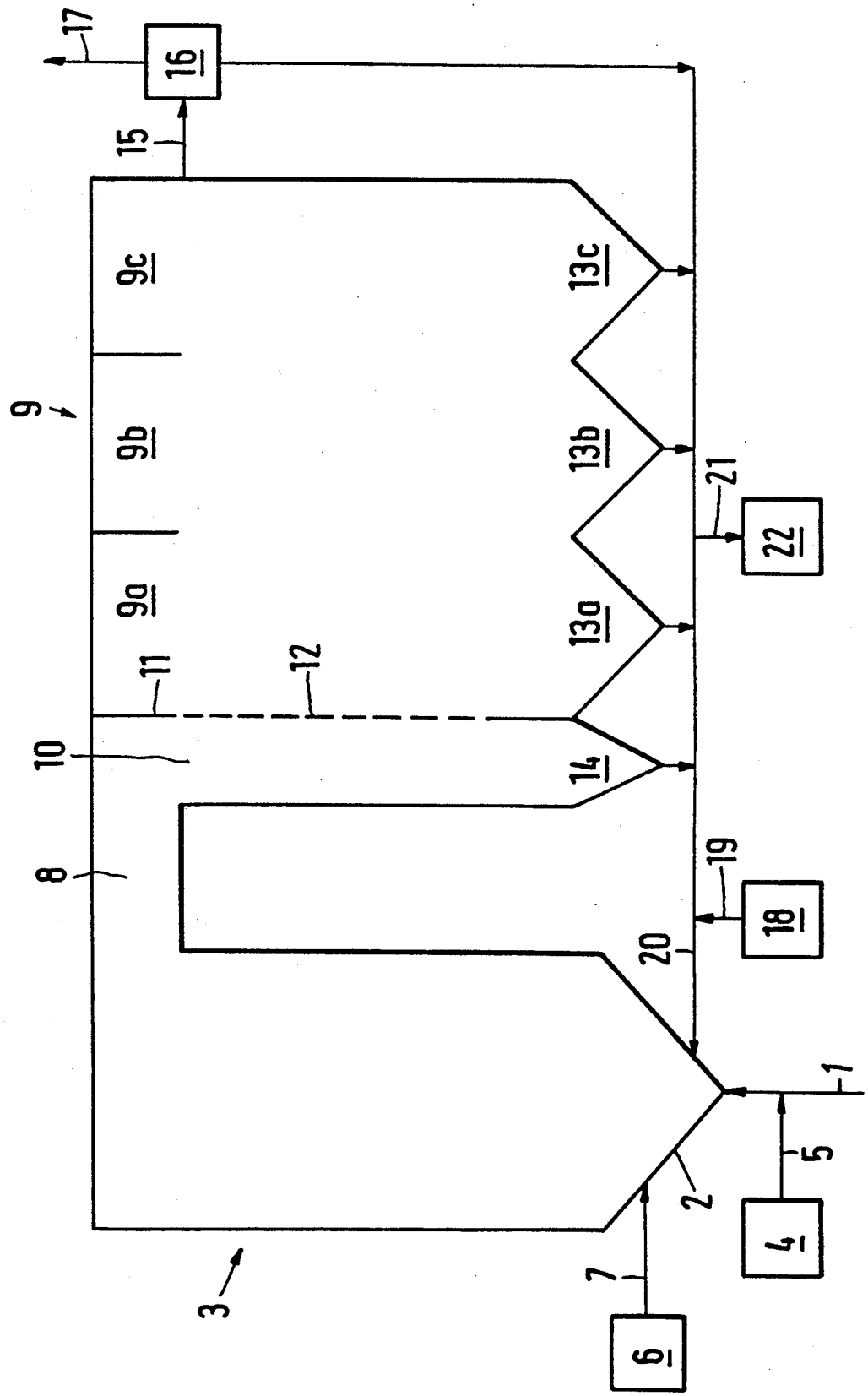

PROCESS AND APPARATUS FOR REMOVING DUST, SULFUR COMPOUNDS AND NITROGEN OXIDES FROM COMBUSTION EXHAUST GASES

BACKGROUND OF THE INVENTION

This invention relates to a process for removing dust, sulfur compounds and nitrogen oxides from combustion exhaust gases and to an apparatus for carrying out the process.

In the generation of electrical power by combustion processes and for carrying out endothermic combustion processes using atmospheric oxygen, combustion exhaust gases are produced which contain nitrogen, carbon dioxide, water and oxygen as well as various pollutants. The oxygen content of the combustion exhaust gases amounts to 1 to 10%, as a rule. Pollutants which are regarded as particularly significant include HCl, oxides of sulfur and of nitrogen, i.e. $SO_2$, $SO_3$, NO and $NO_2$, as well as dustlike fly ash, which is entrained by the exhaust gas stream from the combustion chamber. These pollutants must substantially completely be removed from the combustion exhaust gases. The combustion exhaust gases have, as a rule, an $SO_2$ content between 500 and 10,000 mg/sm$^3$ (sm$^3$=standard cubic meter, and their $SO_3$ content amounts only to up to 50 mg/sm$^3$. The content of the oxides of nitrogen in the combustion exhaust gases amounts to about 100 to 3000 mg/sm$^3$, calculated as $NO_2$. The dust content of the combustion exhaust gases is about 1 to 10 g/mg/sm$^3$, as a rule, but may be as high as 50 g/sm$^3$. In addition to these pollutants present in particularly significant amounts, the combustion exhaust gases contain further pollutants, such as $N_2O$, HF, heavy metals, heavy metal compounds, dioxins, furans, highly condensated aromatic hydrocarbons and CO, the removal of which need not be discussed at this juncture.

Known processes for dedusting combustion exhaust gases are carried out on a large scale in practice, and centrifugal separation, filtration and electrostatic precipitation are mainly employed for that purpose. The desulfurization of the combustion exhaust gases, i.e., for a removal of $SO_2$ and $SO_3$, is presently effected by wet or quasi/dry/or dry separating processes, in which either aqueous alkaline solutions or solid absorbents consisting of CaO and/or $Ca(OH)_2$ are employed in most cases. In the known desulfurizing processes a major part of the HCl is also removed from the combustion exhaust gases. There removal of the nitrogen oxides NO and $NO_2$ is presently effected by a catalytic reduction with $NH_3$ at temperatures from 300° to 500° C. or by a non-catalytic reduction with $NH_3$ at 750° to 1000° C. A simultaneous desulfurization and removal of nitrogen oxides from combustion exhaust gases has also been proposed.

Published German Application 3,642,980 discloses the catalytic reduction of NO contained in a gas with $NH_3$ as a reducing agent in a process, in which the NO-containing gas is mixed with $NH_3$, and the mixture is reacted at 185° to 500° C. and under normal pressure on a catalyst, which consists of an acid support and the catalytically active substances $CuSO_4$, $MnSO_4$, $FeSO_4$ and/or $Fe_2(SO_4)_3$. In Published German Application 3,642,980 it has also been proposed to effect the catalytic reduction of NO in a fluidized bed, particularly in a circulating fluidized bed. That known process is directed not only to the removal of nitrogen oxides from combustion exhaust gases but permits a deduster to be used, which succeeds the catalytic removal of nitrogen oxides and removes the dust still contained in the exhaust gases.

Besides, Published German Application 3,701,527 proposes a simultaneous removal of nitrogen oxides and sulfur compounds from an oxygen-containing exhaust gas in a process in which the exhaust gas is mixed with $NH_3$ and is then supplied as a fluidizing gas to a fluidized bed, which consists of a catalyst, which effects a reduction of NO with $NH_3$ to $N_2$ and $H_2O$ and an oxidation of $SO_2$ with $O_2$ to $SO_3$. The catalyst proposed in Published German Application 3,701,527 comprises a carrier, the catalytically active substances $V_2O_5$ and $Fe_2O_3$, $FeSO_4$ and/or $Fe_2(SO_4)_3$ and alkali sulfates. The $SO_3$ formed by oxidation may be recovered as sulfuric acid or may be bound by a desulfurizing agent, which consists of $Na_2CO_3$, MgO, $MgCO_3$, CaC, $CaCO_3$, and/or $Ca(OH)_2$. The desulfurizing agent may either directly be supplied to the fluidized bed or may be contacted with the fluidizing gas when the latter has left the fluidized bed. The known process is carried out at a temperature from 350° to 600° C. Whereas the process known from Published German Application 3,701,527 permits a simultaneous desulfurization and removal of nitrogen oxides from combustion exhaust gases, it has the disadvantage that a catalyst is required, for which production costs must be incurred and which is consumed in operation by mechanical abrasion. Besides, the process may be disturbed by a relatively high dust content of the raw gas. Finally, it is extremely difficult to completely remove the unconsumed desulfurizing agent—particularly CaO and $Ca(OH)_2$—from the gas which has left the fluidized bed.

SUMMARY OF THE INVENTION

For this reason it is an object of the invention to provide for the removal of dust, sulfur compounds and nitrogen oxides from combustion exhaust gases a process which is reliable and economical in operation and by which sulfur compounds and nitrogen oxides can be removed to a high degree in the presence of the fly ash contained in the combustion exhaust gas and which permits an optimum dedusting, and it is particularly desired to remove virtually all of the unconsumed desulfurizing agent.

The object underlying the invention is accomplished in that the dust-containing combustion exhaust gases are mixed with $NH_3$ and are then supplied as a fluidizing gas to a fluidized bed reactor, which contains mixed solids comprising fly ash, iron sulfates and the calcium compounds $Ca(OH)_2$, $CaCO_3$, CaO, $CaSO_4$ and $CaSO_3$ and is supplied with $Ca(OH)_2$ and $FeSO_4$ and is operated at a temperature between 300° and 450° C., the combustion exhaust gases which have left the fluidized bed reactor are supplied to a multi-stage electrostatic precipitator, the solids collected in the first stage of the electrostatic precipitator are recycled to the fluidized bed reactor, and the solids collected in the further stages of the electrostatic precipitator are partly recycled to the fluidized bed reactor and partly discharged. That processing will desirably result in a removal of dust, sulfur compounds and nitrogen oxides from the combustion exhaust gases to substantial degrees. The residual dust content of the pure gas can always be kept below 50 mg/sm$^3$ and the contents of each of $SO_2$ and $NO_x$ (if the latter is calculated as $NO_2$) in the pure gas will always lie below 200 mg/sm$^3$. Besides, iron sulfates will be discharged from the process only at very low rates because at least 90% of the iron sulfates are collected in the first stage of the electrostatic precipitator and recycled to the fluidized bed reactor. A special advantage which is afforded by the process in accordance with the invention and which was not predictable by a person skilled in the art resides in that the iron sulfates which have passed through the first stage of the electrostatic precipitator will decisively promote the collection of the particulate fly ash of the particulate reaction product of $Ca(OH)_2$—i.e., $CaSO_3$, $CaSO_4$ and $CaCO_3$—and of the particular unconsumed $Ca(CH)_2$ so that almost all of the unconsumed $Ca(CH)_2$ will remain in the solids cycle and will be available for binding the oxides of sulfur. Because the iron sulfates cause the $Ca(OH)_2$ to be almost completely collected in the electrostatic precipitator, the overstoichiometric molar surplus in which $Ca(OH)_2$ is present in relation to the total sulfur content of the combustion exhaust gases will amount to only 1.3 to 1.8, in contrast to the molar surplus which is usual in the known dry desulfurizing process. That advantage constitutes a substantial technological progress. Finally, the HCl which is present in the combustion exhaust gas will be almost entirely removed in that it is reacted with the $Ca(OH)_2$. The iron sulfates contained in the fluidized bed reactor are derived from $FeSO_4$, which is supplied in a form in which it contains water of crystallization to the fluidized bed reactor. The iron sulfates are an anhydrous mixture of $FeSO_4$, $Fe_2(SO_4)_3$ and oxisulfates of iron. The calcium compounds contained in the fluidized bed reactor are produced by a reaction of $SO_2$, $SO_3$, and $CO_2$ with the $Ca(OH)_2$ which is supplied to the fluidized bed reactor.

According to a further feature of the invention, 0.7 to 1.3 moles $NH_3$ are added to the combustion exhaust gases per mole of $NO_2$. The $NH_3$ surplus will not result in a presence of ammonia in the pure gas, and the solid processing residues withdrawn from the electrostatic precipitator will contain ammonia salts only in a very small amount.

According to a further feature of the invention the $Ca(OH)_2$ is replaced by CaO entirely or in part. This will reduce the processing costs but will not adversely affect the degree of desulfurization. Care must only be taken that the $Ca(OH)_2$ and the CaO are both particulate and have a particle diameter below 50 $\mu$m and that the content of $CaCO_3$ in both said substances is minimized and less than 5% by weight.

In accordance with the invention the fluidized bed reactor is operated at a mean solids concentration of 0.3 to 3 kg/sm$^3$ and a gas velocity of 2.5 to 7.5 m/sec. Under said conditions all reactants will be uniformly mixed and the fluidized bed reactor will not be subjected to mechanical erosion by the solid particles. For this reason the crystal structure of the iron sulfates, particularly of the $FeSO_4$, will also substantially be preserved under the conditions employed in accordance with the invention.

The degree to which nitrogen oxides are removed can be increased in that, in accordance with a further feature of the invention, 0.1 to 0.5 moles $MnSO_4$ are added to the mixed solids per mole of $FeSO_4$ which is supplied to the fluidized bed reactor. By that measure the removal of nitrogen oxides can be increased from about 90% to about 93 to 95%. On the other hand, the $MnSO_4$—as well as the iron sulfates—will be contained only in such a small amount in the solid process products leaving the electrostatic precipitator that it will not pollute the environment.

In accordance with the invention the $FeSO_4$ is supplied to the fluidized bed reactor as an aqueous solution or as crystalline solids or the $FeSO_4$ is dissolved in water and in that form is applied to quartz sand or fly ash at 300° to 400° C. and the resulting granulate is supplied to the fluidized bed reactor. The formation of an $FeSO_4$—containing granulate will afford the advantage that the abrasion of $FeSO_4$ will be decreased. The direct supply of crystalline $FeSO_4$ to the fluidized bed reactor will afford the special advantage that commercially available products may be used, which contain water of crystallization and are inexpensive.

Finally, a feature of the invention resides in that the fluidized bed reactor is operated to contain mixed solids consisting of 0.1 to 5% by weight iron sulfates, calculated as $FeSO_4$, 10 to 60% by weight fly ash, balance calcium compounds. Very good results will be produced under such conditions as regards the removal of nitrogen oxides as well as sulfur compounds. Any unconsumed carbon which may be contained in the fly ash will not adversely affect the purification of the exhaust gas.

The solid products of the process surprisingly distinguish in that they have only low contents of $CaSO_3$, CaO, and $Ca(OH)_2$ and that the properties of the fly ash are considerably improved by the $CaSO_4$ which is formed by the desulfurizing reaction and by the $CaCO_3$ which is formed as a by-product. It has been found that the handling of the solid product of the process can considerably be improved in that it is sprayed with water because this will result in a crumbly product which has not the nature of dust and owing to the dilution effected by the calcium compounds has only a very low heavy metal content. Besides, a substantial part of the heavy metals contained in the product of the process is present in an immobilized form, e.g., oxides, and this immobility is promoted by the low contents of CaO and $Ca(OH)_2$ and by the binding action of the anhydrous $CaSO_4$.

The object underlying the invention is also accomplished by the provision of an apparatus which serves to carry out the process and which comprises a fluidized bed reactor, which has a conical bottom and is free of internal fixtures, and a multi-stage electrostatic precipitator, which are interconnected by an exhaust gas passage, in which apparatus the line for supplying the dust-containing combustion exhaust gases opens in the conical bottom of the fluidized bed reactor, each stage of the electrostatic precipitator comprises a dust bin, the dust bins are connected to the conical bottom of the fluidized bed reactor by a solids recycle line, and the solids recycle line is provided with means for taking solids from said line. By means of said apparatus the process in accordance with the invention can be carried out with a high reliability in operation even on a large scale. The fluidized bed reactor should have such a height that a means residence time of 2 to 8 seconds will be available for a single pass of the solid particles through the reactor.

In accordance with the invention that wall of the first stage of the electrostatic precipitator which is adjacent to the gas outlet opening of the exhaust gas passage has gas passage openings and a dust bin is provided below said wall and is connected to the conical bottom of the fluidized bed reactor through the solids recycle line. It has surprisingly been found that a large part of the iron sulfates will already be collected at the wall which is formed with the gas passage openings and said part of the iron sulfates can be recycled to the conical portion of the fluidized bed reactor via the dust bin provided below that wall. This means that that design of the electrostatic precipitator will ensure that iron sulfates will be withdrawn from the solids cycle only at a very low rate.

Finally, a feature of the invention resides in that the electrostatic precipitator is succeeded by a bag filter, which is connected by the solids recycle line to the conical bottom of the fluidized bed reactor. That design will be used in cases in which the dust content of the pure gas is required to be less than 20 mg/sm$^3$. The bag filter is cleaned by backwashing or pulsing, and the solid particles which have been retained are recycled in part to the conical portion of the fluidized bed reactor by the solids recycle line. The bag filters and cleaning means employed are known per se.

BRIEF DESCRIPTION OF THE DRAWING

The process in accordance with the invention and the apparatus for carrying out the process will be explained by way of example with reference to the drawing.

The dust-containing combustion exhaust gas, which is at a temperature of about 380° C. and has a dust content of about 6 g/sm$^3$, a mean SO$_2$ content of 1500 mg/sm$^3$ and an NO$_x$ content of about 600 mg/sm$^3$, calculated as NO$_2$, is supplied as a fluidizing gas through a line 1 through the conical bottom 2 of the fluidized bed reactor 3. The fluidized bed reactor 3 has a height of 20 m and is operated at a gas velocity of 4 m/sec. so that the solid particles have a residence time of about 5 sec. in the fluidized bed reactor in each pass. 250 mg gaseous NH$_3$ per sm$^3$ exhaust gas are supplied from the supply tank 4 through line 5 into line 1, which constitutes a mixing line. From the supply bin 6, 2610 mg Ca(OH)$_2$ per sm$^3$ of exhaust gas are pneumatically conveyed through line 7 and the conical bottom into the fluidized bed reactor 3 by means of air as an entraining fluid. The Ca(OH)$_2$ as a mean particle diameter of about 10 μm and a CaCO$_3$ content below 3%.

All reactants are mixed in the fluidized bed reactor 3 and through the gas outlet opening 10 of the exhaust gas passage 8 enter the electrostatic precipitator 9, which consists of three stages 9a, 9b, 9c. That wall 11 of the first stage 9a of the electrostatic precipitator 9 which is adjacent to the exhaust gas passage 8 is provided with gas passage openings 12, through which the exhaust gas enters the first stage 9a of the electrostatic precipitator 9. Each stage of the electrostatic precipitator 9 is provided with a dust bin 13a, 13b or 13c. The dust bin 14 is provided below the exhaust gas passage 8 and directly adjoins the wall 11 of the first stage 9a of the electrostatic precipitator 9. The electrostatic precipitator 9 has the following features known per se: it is provided with corona and collecting electrodes and is cleaned by being rapped and the dust which has been rapped off falls into the dust bins 13a, 13b, and 13c. The dedusted exhaust gas leaves the electrostatic precipitator 9 through line 15 and contains 50 mg/sm$^3$ dust, less than 200 mg/sm$^3$ SO$_2$ and less than 200 mg/sm$^3$ NO$_x$. Additional dust is collected in the bag filter 16 so that the pure gas discharged into the atmosphere through line 17 contains less than 10 mg/sm$^3$ dust. The bag filter is cleaned by a periodic pulsing with a pure gas stream.

366 mg FeSO$_4$.7 H$_2$O per sm$^3$ exhaust gas are conveyed from the supply bin 18 into the fluidized bed reactor 3 through lines 19 and 20 and through the conical bottom 2. During its passage through the fluidized bed reactor 3 and the electrostatic precipitator 9 the FeSO$_4$.7 H$_2$O is dehydrated and partly oxidized so that the product of the process contains mixed iron sulfates. About 90% of the iron sulfates are collected by impingement separation in the dust bin 14 and are recycled through line 20 to the fluidized bed reactor 3. The dust which has been collected in the dust bins 13a, 13b, 13c and in the bag filter 16 is also received by the solids recycle line 20 and is supplied in part to the fluidized bed reactor 3 through the conical bottom 2. The dust being recycled is pneumatically entrained by air.

Part of the solid products of the process which have been collected is taken through line 21 from the solids recycle line 20 and is accumulated in the collecting bin 22 and is subsequently disposed of on a suitable dump, optionally after having been sprayed with water. The product contained in the accumulating bin 22 consists of the following compounds: iron sulfates (calculated as Fe$_2$(SO$_4$)$_3$) = 2.5%
Ca(OH)$_2$ = 0.9%
CaCO$_3$ = 11.1%
CaSO$_3$ = 2.3%
CaSO$_4$ = 26.2%
balance fly ash.

Because the combustion exhaust gases had been produced in the generation of power from hard coal, the product of the process did not contain detectable amounts of mercury, cadmium, and zinc.

The process in accordance with the invention effects a removal of dust by 99.2%, a removal of sulfur compounds by 95% and a removal of nitrogen oxides by 90%. The ratio of CaSO$_4$ to CaSO$_3$ in the end product is about 10:1 and about one-third of the Ca(OH)$_2$ which had been added was reacted to form CaCO$_3$. The process in accordance with the invention is carried out with a ratio of about 1.5:1 of Ca to S; this is regarded as an extremely favorable value. The iron sulfates and particularly the FeSO$_4$ act as a catalyst for the reaction by which the nitrogen oxides NO and NO$_2$ are removed by being reduced by NH$_3$. The catalytic action can be improved by an addition of small amounts of MnSO$_4$ and an adverse of the ash contained in the combustion exhaust gas or the catalytic acidity of the iron sulfates and of the MnSO$_4$ has not been observed in continuous operation. On the other hand, the amount of FeSO$_4$ which is supplied to the fluidized bed reactor can be decreased if the combustion exhaust gas contains only a small amount of NO$_x$, e.g., 300 mg/sm$^3$.

It will be particularly desirable to moisten the solid product of the process after it has been removed from the process cycle. In that case the iron sulfates will be converted to water-insoluble compounds in accordance with the equation

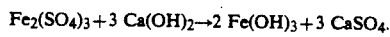
$$Fe_2(SO_4)_3 + 3\ Ca(OH)_2 \rightarrow 2\ Fe(OH)_3 + 3\ CaSO_4.$$

Besides, the CaCO$_3$ contained in the solid product of the process is a good "buffer" for acid rain. Both results will improve the behavior of the solid product of the process in a dump.

We claim:
1. A process of removing dust, sulfur compounds and nitrogen oxides from combustion exhaust gases, comprising the steps of:
   a) mixing a combustion exhaust gas with ammonia to form an ammonia-containing exhaust gas mixture;

b) feeding Ca(OH)$_2$ and FeSO$_4$ to a fluidized bed reactor containing mixed solids, said mixed solids including fly ash, iron sulfates including said FeSO$_4$, and calcium compounds including Ca(OH)$_2$, CaCO$_3$, CaO, CaSO$_4$ and CaSO$_3$;

c) supplying said ammonia-containing exhaust gas mixture to said fluidized bed reactor as a fluidizing gas;

d) operating said fluidized bed reactor at a temperature between 300° and 450° C. while performing said supplying step c) to form a reacted exhaust gas;

e) supplying said reacted exhaust gas to a multistage electrostatic precipitator having a first stage and additional stages to form solids in said first stage and additional solids in said additional stages;

f) collecting said solids in said first stage and recycling said solids in said first stage to said fluidized bed reactor; and g) collecting said additional solids in said additional stages and recycling one portion of said additional solids to said fluidized bed reactor and discharging another portion of said additional solids.

2. A process according to claim 1, wherein the ratio of ammonia mixed with said combustion exhaust gas is such that from 0.7 to 1.3 moles of ammonia are present for each mole of nitrogen dioxide in said ammonia-containing exhaust gas mixture.

3. A process according to claim 1, further comprising the step of replacing a portion of said Ca(OH)$_2$ fed to said fluidized bed reactor in said feed step b) with said CaO.

4. A process according to claim 1, wherein said operating of said fluidized bed reactor is performed with a means solids concentration of 0.3 to 3 kg/sm$^3$ and a gas velocity of 2.5 to 7.5 m/sec.

5. A process according to claim 1, further comprising the step of feeding 0.1 to 0.5 moles of MnSO$_4$ to said fluidized bed reactor per mole of said FeSO$_4$.

6. A process according to claim 1, wherein said FeSO$_4$ fed to said fluidized bed reactor in said feeding step b) is supplied in an aqueous solution.

7. A process according to claim 1, wherein said FeSO$_4$ fed to said fluidized bed reactor in said feeding step b) is supplied as a crystalline solid.

8. A process according to claim 1, wherein said FeSO$_4$ fed to said fluidized bed reactor in said feeding step b) is supplied as a granulate, said granulate being produced by applying an aqueous solution of said FeSO$_4$ to a member selected from the group consisting of quartz sand and fly ash at 300° to 400° C.

9. A process according to claim 1, wherein said mixed solids consists of 0.1 to 5% by weight of said iron sulfates, calculated as said FeSO$_4$, and from 10 to 60% by weight said fly ash with the remaining balance being said calcium compounds.

* * * * *